/

US011132266B2

(12) United States Patent
Ke et al.

(10) Patent No.: US 11,132,266 B2
(45) Date of Patent: Sep. 28, 2021

(54) METHOD, DEVICE, AND COMPUTER PROGRAM PRODUCT FOR MANAGING APPLICATION SYSTEM

(71) Applicant: EMC IP Holding Company LLC, Hopkinton, MA (US)

(72) Inventors: Li Ke, Chengdu (CN); Gang Wang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/863,496

(22) Filed: Apr. 30, 2020

(65) Prior Publication Data

US 2021/0173749 A1    Jun. 10, 2021

(30) Foreign Application Priority Data

Dec. 6, 2019 (CN) .......................... 201911240371.6

(51) Int. Cl.
*G06F 12/00* (2006.01)
*G06F 11/14* (2006.01)
*G06F 3/06* (2006.01)

(52) U.S. Cl.
CPC .......... *G06F 11/1469* (2013.01); *G06F 3/064* (2013.01); *G06F 3/067* (2013.01); *G06F 3/0619* (2013.01); *G06F 3/0685* (2013.01); *G06F 11/1451* (2013.01); *G06F 11/1461* (2013.01); *G06F 11/1464* (2013.01)

(58) Field of Classification Search
None
See application file for complete search history.

(56) References Cited

U.S. PATENT DOCUMENTS

2007/0043790 A1\*  2/2007  Kryger ................ G06F 11/1448

\* cited by examiner

*Primary Examiner* — Daniel D Tsui
(74) *Attorney, Agent, or Firm* — Chamberlain, Hrdlicka, White, Williams & Aughtry

(57) ABSTRACT

The present disclosure relates to a method, device and computer program product for managing an application system. In the method, a backup copy is obtained for a group of data objects. A parent address of a parent backup block corresponding to the parent data object in the backup copy, a first address of a first backup block corresponding to the first data object in the backup copy, and a second address of a second backup block corresponding to the second data object in the backup copy are determined. A parent index entry, a first index entry and a second index entry are generated based the aforementioned addresses. An index for the backup copy is determined based on the parent index entry, the first index entry and the second index entry, the first index entry and the second index entry being continuous in the index.

20 Claims, 14 Drawing Sheets

METHOD, DEVICE, AND COMPUTER PROGRAM PRODUCT FOR MANAGING APPLICATION SYSTEM

CROSS-REFERENCE TO RELATED APPLICATIONS

This application claims priority to Chinese Application No. 201911240371.6 filed on Dec. 6, 2019. Chinese Application No. 201911240371.6 is hereby incorporated by reference in its entirety.

FIELD

Various implementations of the present disclosure relate to management of application systems, and more specifically, to a method, device and computer program product for generating an index for a backup copy of a backup application system.

BACKGROUND

With the development of application systems, various types of application systems have emerged. During use of an application system, a backup may be performed on the application system, so that data objects (e.g., including directories and files) in the application system may be restored to a previous version when the application system fails and/or other case occurs. A user and/or administrator of the application system may select a data object to be backed up, for example, they may select a file or a directory of the application system or even the whole application system for backup. In one backup, a backup copy may be generated, and the generated backup copy may be stored in a backup system. Furthermore, a data object may be recovered from a backup copy. For example, the user and/or administrator of the application system may select to recover one or more data objects from the backup copy.

The backup copy stores a plurality of backed up data objects in a predetermined data structure. Generally, a plurality of files under a same directory in the application system may be stored to a plurality of backup blocks in the backup copy, and the plurality of backup blocks are separated from each other. When the directory needs to be recovered, a plurality of backup blocks corresponding to the plurality of files under the directory need to be searched for in the backup copy. It has become a focus of research for managing the backup copy so as to find in the backup copy a directory which has been backed up and/or backup blocks of files.

SUMMARY

Therefore, it is desirable to develop and implement a technical solution for managing a backup copy more effectively. It is desired that the technical solution be compatible with existing technical solutions for backing up application systems. By reconstructing configurations of existing distributed processing systems, a backup copy of an application system may be generated and a data object maybe effectively recovered based on the generated backup copy.

According to a first aspect of the present disclosure, a method is provided for managing an application system. The application system comprises a group of data objects, which comprises a parent data object, a first data object and a second data object, in a hierarchical structure of the application system, the parent data object being a parent of the first data object and the second data object. In the method, a backup copy is obtained for the group of data objects. A parent address of a parent backup block corresponding to the parent data object in the backup copy, a first address of a first backup block corresponding to the first data object in the backup copy, and a second address of a second backup block corresponding to the second data object in the backup copy are determined, respectively. A parent index entry, a first index entry and a second index entry are generated based on the parent address, the first address and the second address. An index for the backup copy is determined based on the parent index entry, the first index entry and the second index entry, the first index entry and the second index entry being continuous in the index.

According to a second aspect of the present disclosure, an electronic device is provided, the electronic device comprising: at least one processor; and a memory coupled to the at least one processor, the memory having instructions stored thereon, the instructions, when executed by the at least one processor, causing the device to perform acts for managing an application system. The application system comprises a group of data objects, which comprises a parent data object, a first data object and a second data object, the parent data object being a parent of the first data object and the second data object in a hierarchical structure of the application system. The acts include: obtaining a backup copy for the group of data objects; determining a parent address of a parent backup block corresponding to the parent data object in the backup copy, a first address of a first backup block corresponding to the first data object in the backup copy, and a second address of a second backup block corresponding to the second data object in the backup copy, respectively; generating a parent index entry, a first index entry and a second index entry based on the parent address, the first address and the second address, respectively; and determining an index for the backup copy based on the parent index entry, the first index entry and the second index entry, the first index entry and the second index entry being continuous in the index.

According to a third aspect of the present disclosure, a computer program product is provided. The computer program product is tangibly stored on a non-transitory computer-readable medium and comprises machine-executable instructions which are used to implement a method according to the first aspect of the present disclosure.

BRIEF DESCRIPTION OF THE DRAWINGS

Through a more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text can also comprise other explicit and implicit definitions.

Various application systems have emerged in different application environments. For example, a personal computer may be one example of the application systems, and the personal computer may comprise various types of files, such as documents, images, audios, videos, etc. The application system may further comprise one or more directories, and the directory may comprise another directory and/or one or more files. In the context of the present disclosure, files and directories may be called data objects. To guarantee the reliability of the personal computer, backups may be performed periodically and/or according to specified rules of a user. For example, files, directories or even the whole application system may be backed up. In another example, a file server may be another example of the application systems, at this point the file server comprising a plurality of files from one or more users. A user and/or administrator may specify some file and/or files may be backed up, and even the whole file server may be backed up.

Figure 1:
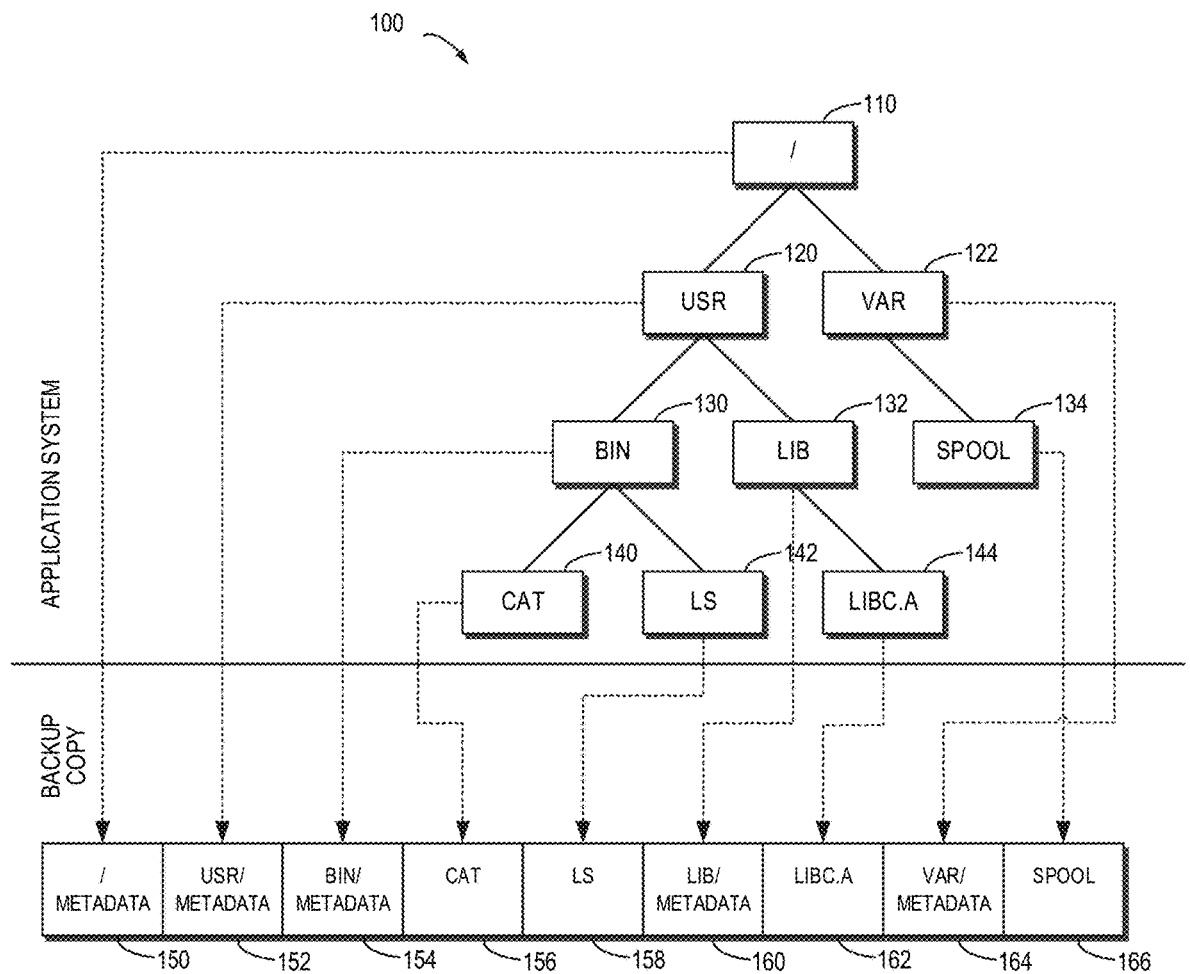
FIG. 1 schematically shows a block diagram of data objects and a corresponding backup copy in an application environment in which example implementations of the present disclosure may be implemented.

FIG. 1 schematically shows a block diagram 100 of data objects and a corresponding backup copy in an application system in which example implementations of the present disclosure may be implemented. An upper portion of FIG. 1 schematically shows a hierarchical structure of data objects in the application system. As depicted, the application system may comprise a data object 110 (i.e., a root directory), and the root directory may comprise two subdirectories, i.e., data objects 120 and 122. The data object 120 may comprise data objects 130 and 132 among which the data object 130 may comprise data objects 140 and 142, the data object 132 may comprise a file 144, and the data object 122 may comprise a file 134. In the application system, the data objects 120 and 122 are siblings, the data objects 130 and 132 are siblings, and the objects 140 and 142 are siblings.

In FIG. 1, various data objects may have a "parent-child relationship." For example, the data objects 120 and 122 are children of the data object 110, while the data object 110 is the parent of the data objects 120 and 122. Data objects may further have a "sibling relationship." For example, the data objects 120 and 122 have a sibling relationship between them, and the data objects 130 and 132 have a sibling relationship between them.

A lower portion of FIG. 1 schematically shows a structure of a backup copy which is formed after performing a backup operation on the application system. The backup copy may comprise a plurality of backup blocks corresponding to a plurality of data objects, respectively. For example, a backup block 150 corresponds to the data object 110, a backup block 152 corresponds to the data object 120, a backup block 154 corresponds to the data object 130, a backup block 156 corresponds to the data object 140, a backup block 158 corresponds to the data object 142, a backup block 160 corresponds to the data object 132, a backup block 162 corresponds to the data object 144, a backup block 164 corresponds to the data object 122, a backup block 166 corresponds to the data object 134.

The backup copy shown in FIG. 1 results from performing depth-first traversal on a group of data objects in the application system. A corresponding backup block may be generated for each data object in the application system in a depth-first order. Subsequently, a plurality of the generated backup blocks may be added to the backup copy in the depth-first order.

Figure 2:
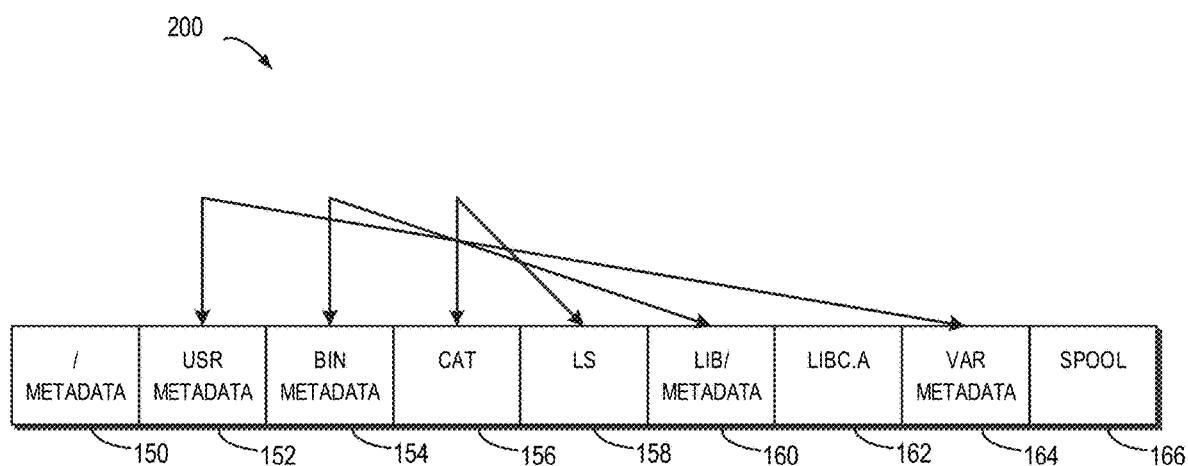
FIG. 2 schematically shows a block diagram of various backup blocks in the backup copy.

It will be understood that since the backup copy is generated according to the depth-first rule, backup blocks of a plurality of data objects under the same directory in the backup copy might be distributed in discrete locations in the backup copy. FIG. 2 schematically shows a block diagram 200 of various backup blocks in the backup copy. As depicted, the backup blocks 152 and 164 are backup blocks corresponding to the directories "USR" and "VAR" that are siblings, the two backup blocks being in discrete locations in the backup copy. In another example, the backup blocks 154 and 160 are in discrete locations in the backup copy, and the backup blocks 156 and 158 are in discrete locations.

Technical solutions have been proposed to manage a backup copy of an application system. For example, a group of backup blocks corresponding to a group of data objects may be stored based on database technology, and an index may be built based on a hierarchical relationship of the application system. However, operations on the database involve complex computations and require significant computing resources and time, accordingly building the index results in a heavy workload. Furthermore, access to the database will also involve significant computing resources and time, accordingly use of the index results in a heavy workload. Therefore, it is desirable to manage a backup copy of an application system more effectively.

To overcome the above drawbacks, implementations of the present disclosure provide a method for managing an application system. In the method, an index may be built for a group of data objects involved in the backup copy, so that the backup copy may be more effectively managed. On one hand, by storing various index entries in the index by continuous storage space, a workload of generating the index may be reduced, backup blocks of data objects which are included in the backup copy may be quickly displayed based on the index, so as to facilitate the user to understand contents of the backup copy in an easy way. On the other hand, when the user wants to recover some data object/ objects in the application system based on the backup copy, a backup block corresponding to a data object which is desired to be recovered may be quickly found based on the index, and further the data object may be recovered based on the found backup block.

Figure 3:
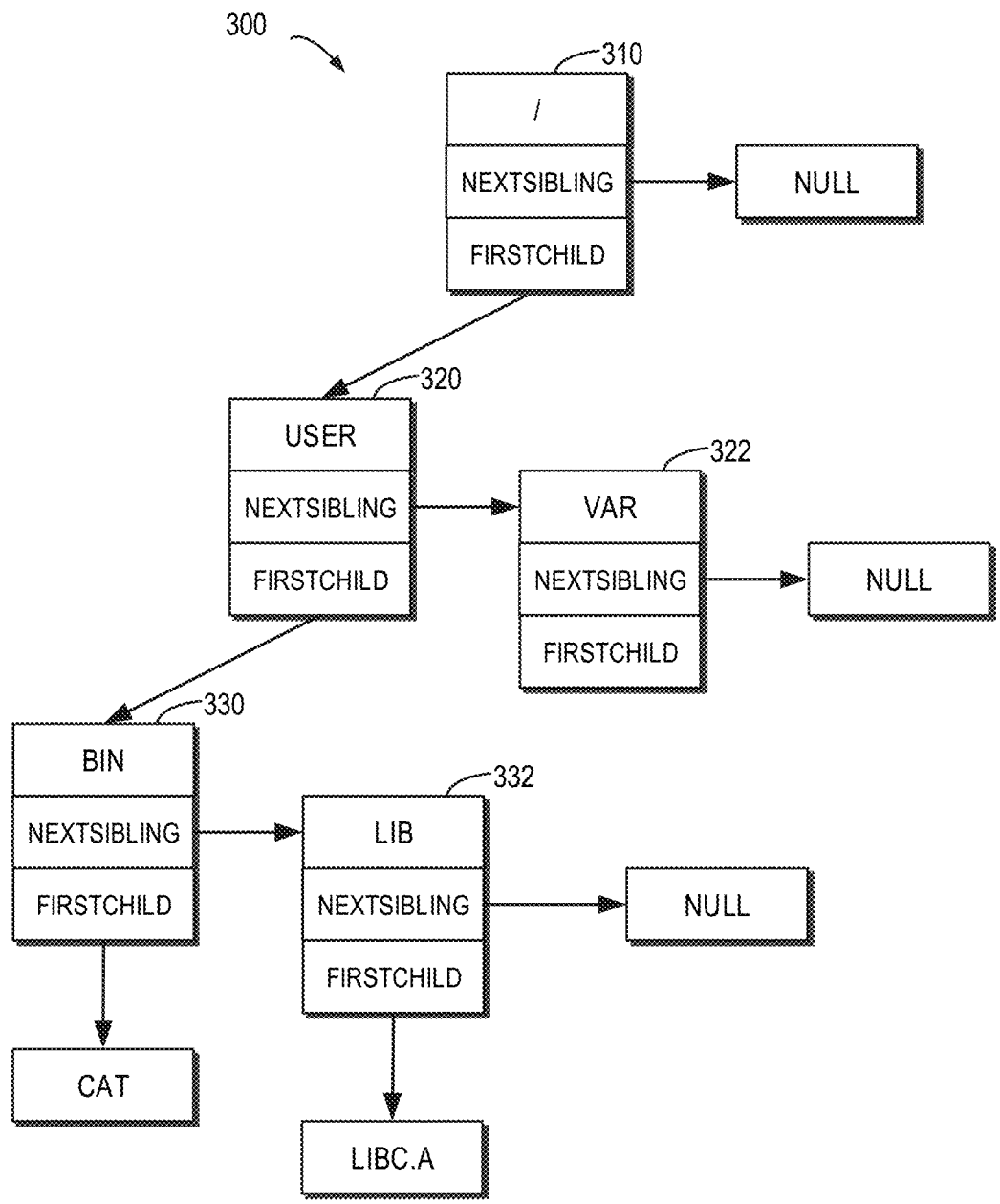
FIG. 3 schematically shows a block diagram of an index for a backup copy according to example implementations of the present disclosure.

FIG. 3 schematically shows a block diagram of an index 300 for the backup copy according to example implementations of the present disclosure. As depicted, the index 300 may be represented as a tree structure, which records a hierarchical relationship between a group of data objects in the application system. For example, an index entry may comprise an identifier of a data object, for indicating to which data object the index entry is directed. The index entry may comprise a reference pointing to the first child of the data object and may further comprise a reference pointing to the next sibling. The index entry, though not shown, may further comprise a reference pointing to an address of the data object in the backup copy.

As shown in FIG. 3, an index entry 310 corresponds to a root directory "/," index entries 320 and 322 correspond to two child directories "USER" and "VAR" of the root directory "/," at which point the directories "USER" and "VAR" have a sibling relationship between them. Index entries 330 and 332 correspond to two child directories "BIN" and "LIB" of the directory "USER," at which point the directories "BIN" and "LIB" have a sibling relationship between them. Arrows in FIG. 3 show "parent-child" and "sibling" relationships among various data objects. For example, an arrow between the index entries 310 and 320 represents a "parent-child" relationship, and an arrow between the index entries 320 and 322 represents a "sibling" relationship.

With example implementations of the present disclosure, by using the index 300 shown in FIG. 3 to record addresses of the group of data objects in the backup copy, it is possible to quickly obtain a hierarchical relationship between a plurality of data objects in the backup copy and addresses of the various data objects in the backup copy. Furthermore, based on addresses in the index 300, a backup block corresponding to a certain data object may be quickly found in the backup copy and further used for a recovery operation. More details on how to generate the index may be described with reference to FIG. 4 below.

Figure 4:
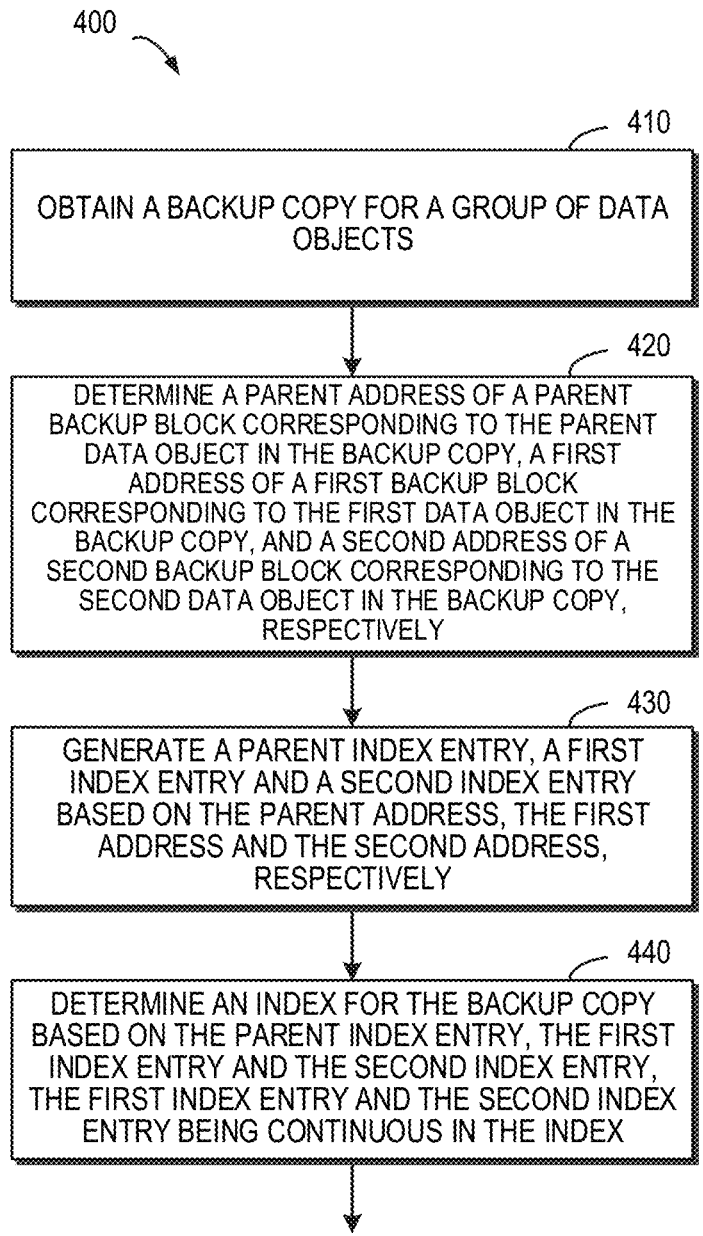
FIG. 4 schematically shows a flowchart of a method for managing an application system according to example implementations of the present disclosure.

FIG. 4 schematically shows a flowchart of a method 400 for managing an application system according to example implementations of the present disclosure. Here, the application system may be an application system shown in FIG. 1, which may comprise a group of data objects 110, 120, 122, 130, 132, 134, 140, 142, 144, etc. As shown in FIG. 1, the group of data objects may comprise the parent data object 110, the first data object 120 and the second data object 122. In the hierarchical structure of the application system, the parent data object 110 is a parent of the first data object 120 and the second data object 122. It will be understood that a data object may be a child of a data object at an upper level, may be a parent of a data object at a lower level, and may be a sibling of a data object at the same level. As shown in FIG. 1, the data object 120 is a child of the data object 110, a parent of the data objects 130 and 132, and a sibling of the data object 122.

It will be understood that although the group of data objects shown in FIG. 1 comprises 4 levels, in other implementations, the application system may further comprise data objects at more or less levels. Regarding a plurality of data objects in the group of data objects, the method 400 may be performed in a recursive way. More details about the method 400 will be described with reference to the application system shown in FIG. 1 and the backup copy of the application system.

At block 410, a backup copy for the group of data objects may be obtained. Here the backup copy may be, for example, the backup copy shown in FIG. 1. It will be understood that the backup copy here may be generated in advance. For example, a backup copy may be generated according to an existing method, and an index may be built for the backup copy. Alternatively and/or additionally, an index comprising index entries of various data objects may be generated while generating a backup block for each data object in the backup copy.

At block 420, addresses of various data objects in the group of data objects in the backup copy may be determined, respectively. For example, a parent address of a parent backup block corresponding to the parent data object in the backup copy may be determined. Returning to FIG. 1, the parent data object is the data object 110, at which point the parent address may be an address of the backup block 150 associated with the data object 110 in the backup copy. Furthermore, a first address of a first backup block corresponding to the first data object in the backup copy and a second address of a second backup block corresponding to the second data object in the backup copy may be obtained, respectively. As shown in FIG. 1, the first data object is the data object 120, and the first address may be an address of the backup block 152 corresponding to the data object 120 in the backup copy. The second data object is the data object 122, and the second address may be an address of the backup block 164 corresponding to the data object 122 in the backup copy.

It will be understood that although description is presented herein by taking an example that the data objects 110, 120 and 122 are a parent data object and two children of the parent data object, respectively, each data object in the application system may be traversed, and a similar operation may be recursively performed on each parent data object.

Subsequently, index entries for various data objects may be generated based on obtained addresses of various backup blocks in the backup copy, respectively. Specifically, at block 430 in FIG. 4, a parent index entry, a first index entry and a second index entry may be generated based on the parent address, the first address and the second address, respectively. Here the index entries may be similar to various index entries shown in FIG. 3. For example, the parent index entry may correspond to the index entry 310, the first index entry may correspond to the index entry 320, and the second index entry may correspond to the index entry 322 in FIG. 3.

At block 440, an index for the backup copy may be determined based on the parent index entry, the first index entry and the second index entry, the first index entry and the second index entry being continuous in the index. It will be understood that the index in the present disclosure may be implemented in various ways, so long as the index structure may describe contents shown in FIG. 3. For example, the index may be implemented using the linked list structure shown in FIG. 3. According to example implementations of the present disclosure, the first data object is the first child of the parent data object, and the second data object is the next sibling of the first data object. For example, the directory "USR" is the first child of the directory "/," and the directory "VAR" is the second child of the directory "/," i.e., a sibling of the directory "USR." A data structure of an index entry may be defined, which may comprise: a pointer pointing to an address of a backup block in the backup copy, a pointer pointing to the first child of a data object, and a pointer pointing to the next sibling of the data object.

According to example implementations of the present disclosure, the index may further be implemented based on an array. More details on how to store the index in the array will be described with reference to FIG. 5. This figure schematically shows a block diagram 500 of a data structure of an index for the backup copy according to example implementations of the present disclosure. As depicted, the index may comprise a header 502 and a plurality of index entries following the header 502, and each index entry may correspond to one data object. The index entry may have a predetermined length, for example, it may be defined that the index entry is represented with 16 bytes.

At this point, in the generated index, the header 502 comprises the $0^{th}$ to $15^{th}$ bytes, an index entry 510 for the root directory "/" (data object 110) comprises the $16^{th}$ to $31^{st}$ bytes, an index entry 512 for the directory "USR" (data object 120) comprises the $32^{nd}$ to $47^{th}$ bytes, an index entry 514 for the directory "VAR" (data object 122) comprises the $48^{th}$ to $63^{rd}$ bytes, an index entry 516 for the directory "BIN" (data object 130) comprises the $64^{th}$ to $79^{th}$ bytes, an index entry 518 for the directory "LIB" (data object 132) comprises the $80^{th}$ to $95^{th}$ bytes, an index entry 520 for the directory "CAT" (data object 140) comprises the $96^{th}$ to $111^{th}$ bytes, an index entry 522 for the directory "LS" (data object 142) comprises the $112^{th}$ to $127^{th}$ bytes, an index entry 524 for the file "LIBC.A" (data object 144) comprises the $128^{th}$ to $143^{rd}$ bytes, and an index entry 526 for the file "SPOOL" (data object 134) comprises the $144^{th}$ to $159^{th}$ bytes.

Figure 5:
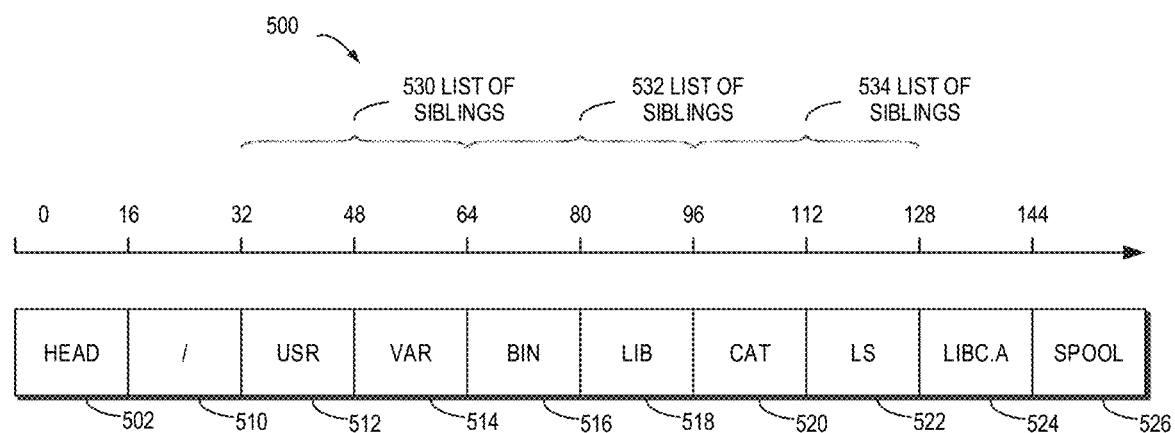
FIG. 5 schematically shows a block diagram of a data structure of an index for the backup copy according to example implementations of the present disclosure.

In the data structure shown in FIG. 5, index entries for sibling nodes are in continuous locations in the index. In other words, index entries of all child data objects of the same parent data object are continuously stored. As shown in FIG. 5, a virtual sibling array 530 comprises index entries for the sibling directories "USR" and "VAR," and the index entries 512 and 514 are continuously stored. A virtual sibling array 532 comprises index entries for the sibling directories "BIN" and "LIB," and the index entries 516 and 518 are continuously stored. A virtual sibling array 534 comprises index entries for the sibling directories "CAT" and "LS," and the index entries 520 and 522 are continuously stored.

With example implementations of the present disclosure, the index may be stored in a persistent storage device (e.g., stored in a hard disk as a file or in another way). Since index entries for backup blocks of sibling data objects are continuous, when the index is read, a plurality of continuous index entries may be read to a cache at one time, and further the frequent reading of the index from the persistent storage device that has a lower access speed may be avoided. More details about index entries will be described with reference to FIG. 6.

Figure 6:
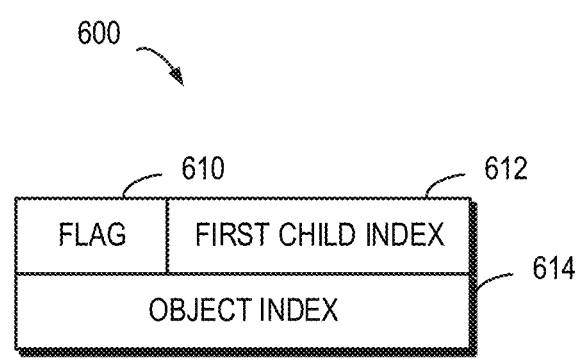
FIG. 6 schematically shows a block diagram of an index entry in the index according to example implementations of the present disclosure.

FIG. 6 schematically shows a block diagram 600 of an index entry in the index according to example implementations of the present disclosure. As depicted, the index entry may comprise: an index flag 610, a first child index 612 and an object index 614. The index flag 610 may be used to indicate whether a current data object is the last child in the hierarchical structure. For example, the index flag 610 may be denoted by 0 or 1. The first child index 612 may be used to indicate a first location of an index entry of the first child of the current data object in the index. Regarding the index entry 510, its first child index may indicate a first location of the first index entry (i.e., the index entry 512 of the directory "USR," which is the first child of the directory "/") in the index. The object index 614 may be used to indicate an address of a backup block corresponding to the current data object in the backup copy. Regarding the index entry 510, its object index may point to an address of the backup block 150 corresponding to the directory "/" in the backup copy.

It will be understood that details about index entries have been described by taking an example where the directory "/" is used as a parent data object and the directories "USR" and "VAR" are used as the first child and the second child of the parent data object, and index entries for other data objects have similar contents. For example, regarding the index entry of the directory "USR," the index flat may be set to "0," indicating that the directory "USR" is not the last child; the first child index may point to the index entry of the directory "BIN;" and the object index may point to an address of the backup block 152 associated with the directory "USR" in the backup copy.

According to example implementations of the present disclosure, first, the header 502 of the index may be generated, and then each index entry may be generated gradually, and the generated index entries may be appended to the index. Specifically, the index entry 510 generated for the directory "/" may be appended to the header 502, at which point the header 502 and the index entry 510 are in continuous storage space. Subsequent index entries for children of the directory "/" may be appended to the end of the index. For example, the index entry 512 for the directory "USR" may be appended to the parent index entry 510, and the index entry 514 generated for the directory "VAR" may be appended to the index entry 512. Similarly, corresponding index entries for other data objects may be generated.

Figure 7:
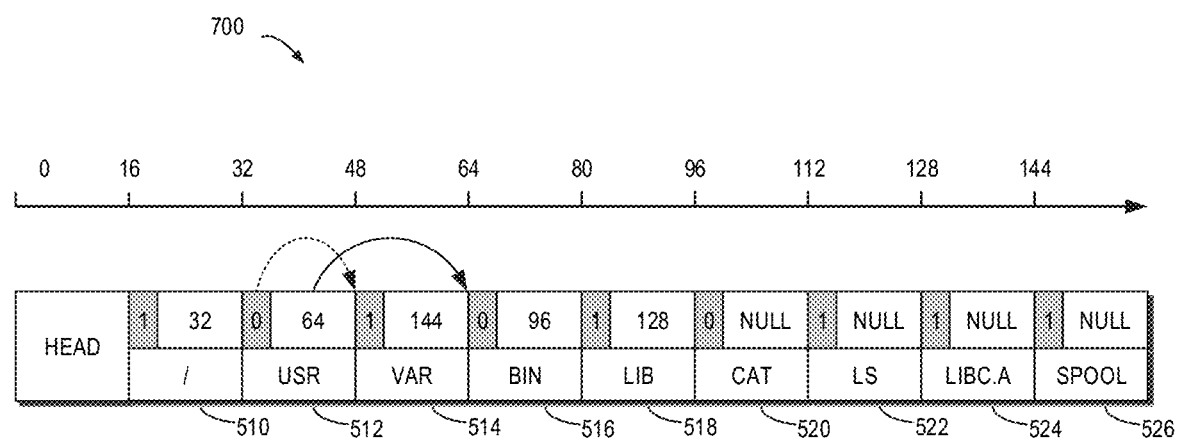
FIG. 7 schematically shows a block diagram of relationships between various index entries in the index for the backup copy according to example implementations of the present disclosure.

FIG. 7 schematically shows a block diagram 700 of relationships between various index entries in the index for the backup copy according to example implementations of the present disclosure. In this figure, a data structure of various index entries is as shown in FIG. 6. The index flag of the index entry 512 is set to "0," indicating that the directory "USR" is not the last child (as shown by a dotted arrow in FIG. 7, the directory "USR" has a sibling directory "VAR"). Further, the first child of the index entry 512 is set to "64," which indicates an address of the index entry 516 for the first child (i.e., the directory "BIN") of the directory "USR" in the index. Since the index entry 516 is stored at the $64^{th}$ to $79^{th}$ bytes, the first child index in the index entry 512 points to a start address 64 of the index entry 516.

According to example implementations of the present disclosure, the index may be generated during generating each backup block in the backup copy. Here, the backup copy may be generated based on the depth-first rule. According to example implementations of the present disclosure, based on the depth-first rule, each data object in the application system may be traversed, and a backup block may be generated for each data object. An index entry for each data object may be generated before, during or after generating the backup block. For example, first, continuous storage space may be applied for holding the index. The header 502 of the index may first be defined in the applied storage space. Based on the depth-first rule, the root directory "/" may be reached, the corresponding backup block 150 may be generated for the root directory, and the generated backup block 150 may be added to the backup copy. The index entry 510 used for the root directory "/" may be defined in a location after the header 502 in the index.

Subsequently, the first child of the root directory "/," i.e., the directory "USR" may be reached based on the depth-first rule. The corresponding backup block 152 may be generated for the directory "USR," and the generated backup block 152 may be added to the backup copy. The index entry 512 used for the directory "USR" may be defined in a location after the index entry 510 in the index. Next, based on the depth-first rule, the flow may proceed to process children of the directory "USR", until all data objects in the application system have been processed.

It will be understood that although description has been presented on how to generate the index during generating the backup copy, alternatively and/or additionally, the index may be created for a backup copy that has been generated. Although creating the index for the generated backup copy will involve extra overheads of traversing data objects and backup blocks, the generated index may speed up a recovery operation and further reduce time overheads of the recovery operation. In other words, with the index, it is possible to quickly find the data object that is desired to be recovered, and further improve the performance of the recovery operation.

It will be understood that although the above paragraphs show the case in which the parent data object comprises only two children, the parent data object may further comprise one or more children, and the method 400 is further applicable to cases in which there is one or more children. When the parent data object comprises one child, at this point the second data object will become null, and the method 400 is still valid. When the parent data object comprises more than two children, other children of the parent node may be processed one by one. At this point, the first data object and the second data object will have more siblings, and index entries for a plurality of siblings will be continuously stored in the index.

Description is presented below for a case in which the parent data object comprises three child nodes. According to example implementations of the present disclosure, the group of data objects further comprise a third data object. In the hierarchical structure of the application system, the third data object is the next sibling of the second data object. At this point, a third address of a third backup block corresponding to the third data object in the backup copy may be determined, and a third index entry may be generated based on the third address. Subsequently, the third index entry may be appended to the second index entry. With example implementations of the present disclosure, index entries for all children of the parent data object will be continuously stored in the index.

It will be understood that when traversing each data object in the application system according to the depth-first rule, addresses where index entries for all children of the parent data object are stored are not known when generating a parent index entry for the parent data object. Therefore, "the first child index" in the parent index entry may initially be in "unset" state. As more data objects in the application system are traversed, when a child of the parent data object is reached, an index entry may be generated for the child, and contents in the parent index entry may be updated using an address of the generated index entry in the index.

According to example implementations of the present disclosure, a location of the index entry of the child data object in the index may be determined, and "the first child index" in the index entry for the parent data object may be updated using the determined location. Specifically, a first location of the first index entry in the index may be determined. For example, regarding the application system shown in FIG. 1, the initially generated first child index in the index entry 510 for the directory "/" may be defined as "unset" state. Subsequently, the parent index entry may be updated based on the first location, so that the updated parent index entry comprises the first location. After determining that a location of the index entry of a child (i.e., directory "USR") of the directory "/" in the index is the $32^{nd}$ to $63^{rd}$ bytes, "unset" in the index entry 510 may be modified to the determined location, that is, "the first child index" may point to the start location (the $32^{nd}$ byte).

According to example implementations of the present disclosure, in the hierarchical structure, the group of data objects may be traversed according to the depth-first rule, in order to obtain the parent data object. Related information of the parent data object may be stored using a stack, so that a location of the parent data object in the hierarchical structure may be recorded. Specifically, the parent index entry may be pushed into the stack and appended to the index. Further, a child of the parent data object may be found according to the depth-first rule, and all children of the parent data object may be recursively processed. For example, an index entry related to another child data object may be pushed into the stack and appended to the index.

With reference to FIGS. 8A to 8I, description is presented below on how to generate various index entries in the index. FIGS. 8A to 8I schematically show block diagrams of the procedure for generating the index according to example implementations of the present disclosure, where these figures show the procedure of generating a plurality of index entries in chronological order. Table 1 schematically shows operations which are performed on the backup copy, the stack and the stack, respectively. Specifically, the first column in Table 1 shows identifiers of steps. For example, step A corresponds to the operation procedure shown in FIG. 8A, step B corresponds to the operation procedure shown in FIG. 8B, and so on. In Table 1, the second column shows operations performed on the backup copy, the third column shows operations performed on the index, and the fourth column shows operations performed on the stack.

TABLE 1

Operation Steps

| Steps | Operations on backup copy | Operations on index | Operations on stack |
|---|---|---|---|
| A | Add the backup block for the data object "/" | Generate the index entry for the data object "/;" Update the "object index" of the index entry of the data object "/" with an address of the backup block of the data object "/" in the backup copy; | Push the index of the data object "/" into the stack |

TABLE 1-continued

Operation Steps

| Steps | Operations on backup copy | Operations on index | Operations on stack |
|---|---|---|---|
| B | Add the backup block for the data object "USR" | Generate the index entries for the data objects "USR" and "VAR," respectively; Update the "object index" of the index entry of the data object "USR" with an address of the backup block of the data object "USR" in the backup copy; Update the "first child index" of the index entry of the data object "/" with an address of the index entry of the data object "USR" in the index; | Push the index of the data object "USR" into the stack |
| C | Add the backup block for the data object "BIN" | Generate the index entries for the data objects "BIN" and "LIB," respectively; Update the "first child index" of the index entry of the data object "USR" with an address of the index entry of the data object "BIN" in the index; Update the "object index" of the index entry of the data object "BIN" with an address of the backup block of the data object "BIN" in the backup copy; | Push the index of the data object "BIN" into the stack |
| D | Add the backup block for the data object "CAT" | Generate the index entries for the data objects "CAT" and "LS;" Set "the first child index" of the data object "CAT" as "null;" Update the "object index" of the index entry of the data object "CAT" with an address of the backup block of the data object "CAT" in the backup copy; Update the "first child index" of the index entry of the data object "BIN" with an address of the index entry of the data object "CAT" in the index; | No operation |
| E | Add the backup block for the data object "LS" | Set "the first child index" of the data object "LS" as "null;" Update the "object index" of the index entry of the data object "LS" with an address of the backup block of the data object "LS" in the backup copy; | Pop the index of "BIN" from the stack (since "LS" is the last child) |
| F | Add the backup block for the data object "LIB" | Update the "object index" of the index entry of the data object "LIB" with an address of the backup block of the data object "LIB" in the backup copy; | Push the index of the data object "LIB" into the stack |
| G | Add the backup block for the data object "LIBC.A" | Generate the index entry for the data object "LIBC.A;" Update the "first child index" of the index entry of the data object "LIB" with an address of the index entry of the data object "LIBC.A" in the index; Set "the first child index" of the data object "LS" as "null;" Update the "object index" of the index entry of the data object "LIBC.A" with an address of the backup block of the data object "LIBC.A" in the backup copy; | Pop the index of "LIB" from the stack (since "LIBC.A" is the last child); Pop the index of "USR" from the stack (since "LIB" is the last child); |
| H | Add the backup block for the data object "VAR" | Update the "object index" of the index entry of the data object "VAR" with an address of the backup block of the data object "VAR" in the backup copy; | Push the index of the data object "VAR" into the stack |
| I | Add the backup block for the data object "SPOOL" | Generate the index entry for the data object "SPOOL;" Update the "first child index" of the index entry of the data object "VAR" with an address of the index entry of the data object "SPOOL" in the index; Set "the first child index" of the data object "SPOOL" as "null;" Update the "object index" of the index entry of the data object "SPOOL" with an address of the backup block of the data object "SPOOL" in the backup copy; | Pop the index of "VAR" from the stack (since "SPOOL" is the last child); Pop the index of "/" from the stack (since "VAR" is the last child); |

Figure 8A:
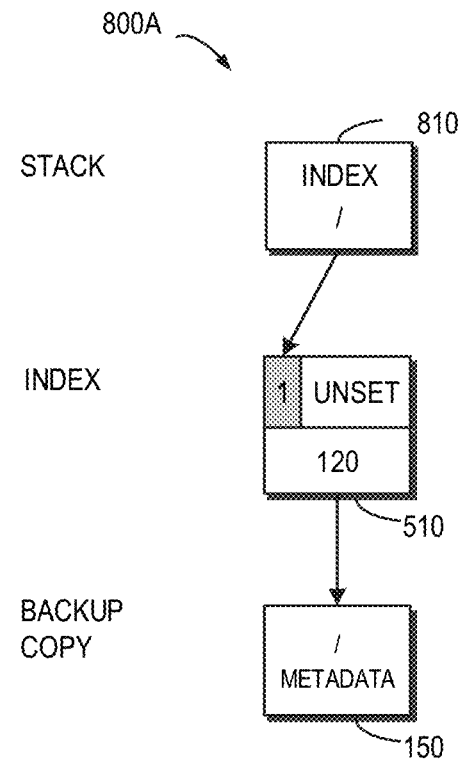
FIGS. 8A to 8I schematically show block diagrams of procedures for generating the index according to example implementations of the present disclosure, respectively.

First, operations about step A will be described with reference to FIG. 8A. As depicted, the backup block 150 for the data object "/" may be added to the backup copy. Regarding the index, the index entry 510 may be generated for the data object "/," at which point "the first child index" in the index entry 510 may be defined as "unset," the identifier may be defined as "1," and "the object index" may be defined as pointing to the address of the backup block 150 of the data object "/" in the backup copy, e.g., "120." Regarding the stack, the index of the data object "/" may be pushed into the stack to form a stack entry 810, at which point the stack may comprise the stack entry 810.

Figure 8B:
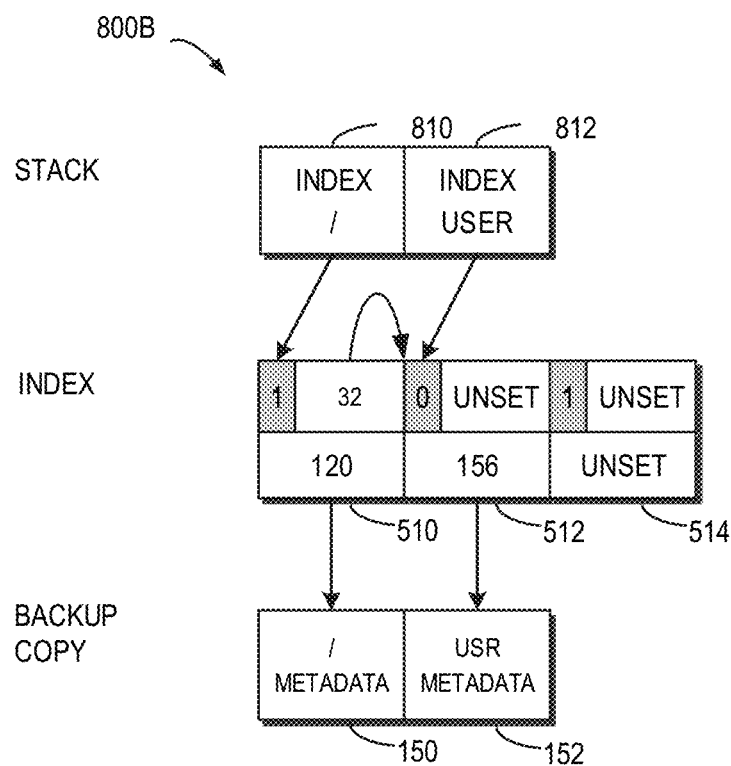

Operations about step B will be described with reference to FIG. 8B. As depicted, the backup block 152 for the data object "USR" may be added to the backup copy. Regarding the index, the index entry 512 may be generated for the data object "USR," at which point "the first child index" in the index entry 512 may be defined as "unset," the identifier may be defined as "0," and "the object index" may be defined as pointing to the address of the backup block 152 of the data object "USR" in the backup copy, e.g., "156." The index entry 514 may be generated for the data object "VAR," at which point "the first child index" in the index entry 514 may be defined as "unset," the identifier may be defined as "1," and "the object index" may be defined as "unset." Furthermore, "the first child index" of the index entry of the data object "/" may be updated with the address of the index entry of the data object "VAR" in the index. At this point, "the first child index" in the index entry 510 is set as 32, i.e., the address of the index entry 512 of the data object "USR" in the index is "32." Regarding the stack, the index of the data object "USR" may be pushed into the stack to form a stack entry 812, at which point the stack may comprise the stack entries 810 and 812.

Figure 8C:
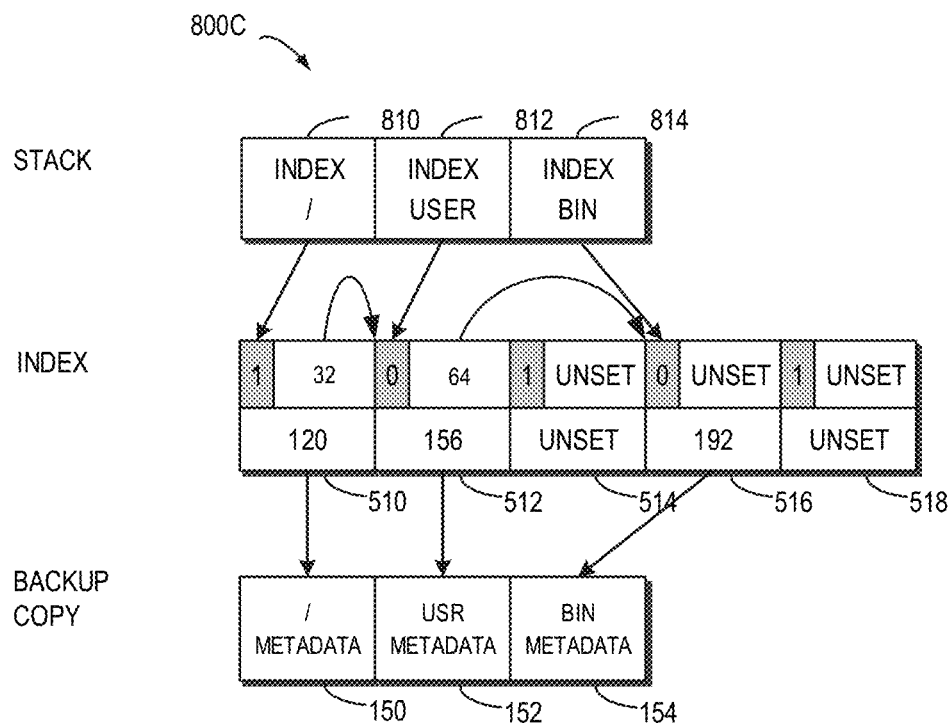

Operations about step C will be described with reference to FIG. 8C. As depicted, the backup block 154 for the data object "BIN" may be added to the backup copy. Regarding the index, the index entry 516 may be generated for the data object "BIN," at which point "the first child index" in the index entry 516 may be defined as "unset," the identifier may be defined as "0," and "the object index" may be defined as pointing to the address of the backup block 154 of the data object "BIN" in the backup copy, e.g., "192." The index entry 518 may be generated for the data object "LIB," at which point "the first child index" in the index entry 518 may be defined as "unset," the identifier may be defined as "1," and "the object index" may be defined as "unset." Furthermore, "the first child index" of the index entry of the data object "USR" may be updated with the address of the index entry of the data object "BIN" in the index. Regarding the stack, the index of the data object "BIN" may be pushed into the stack to form a stack entry 814, at which point the stack may comprise the stack entries 810, 812 and 814.

Figure 8D:
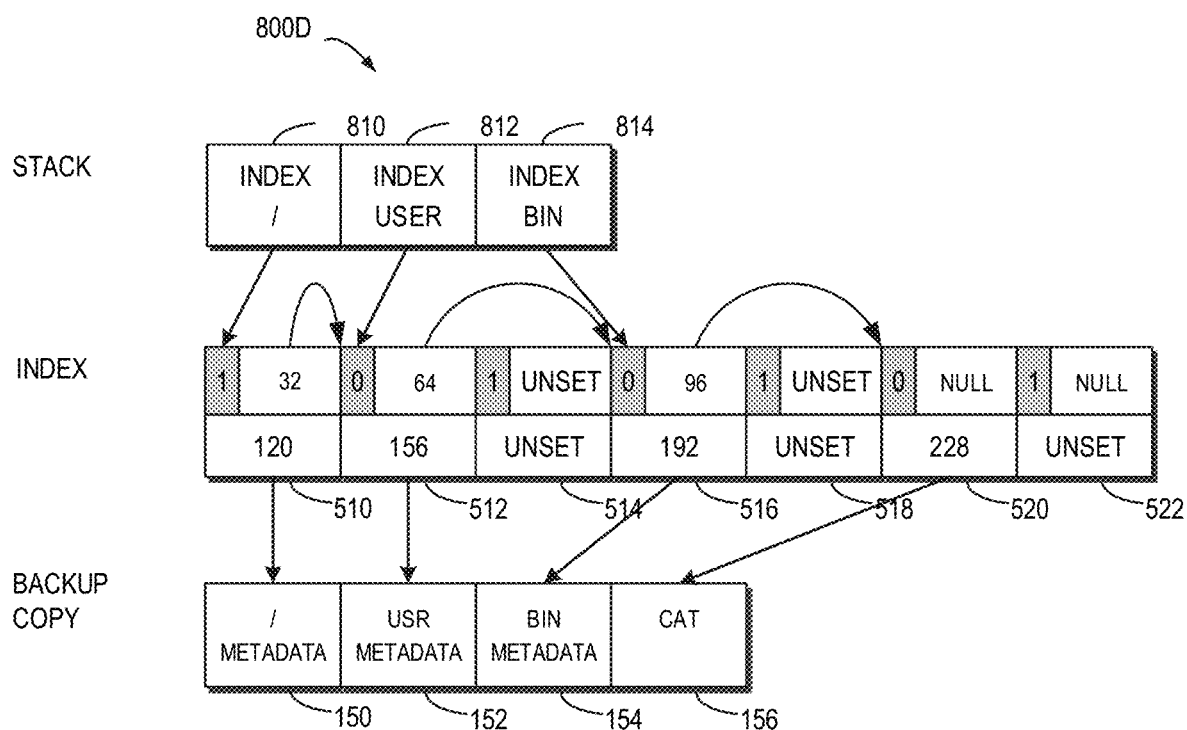

Operations about step D will be described with reference to FIG. 8D. As depicted, the backup block 156 for the data object "CAT" may be added to the backup copy. Regarding the index, the index entry 520 may be generated for the data object "CAT," at which point "the first child index" in the index entry 520 may be defined as "null," the identifier may be defined as "0," and "the object index" may be defined as pointing to the address of the backup block 156 of the data object "CAT" in the backup copy, e.g., "228." The index entry 522 may be generated for the data object "LS," at which point "the first child index" in the index entry 522 may be defined as "null," the identifier may be defined as "1," and "the object index" may be defined as "unset." Regarding the stack, since the data object "CAT" has no child, no operation is performed on the stack.

Figure 8E:
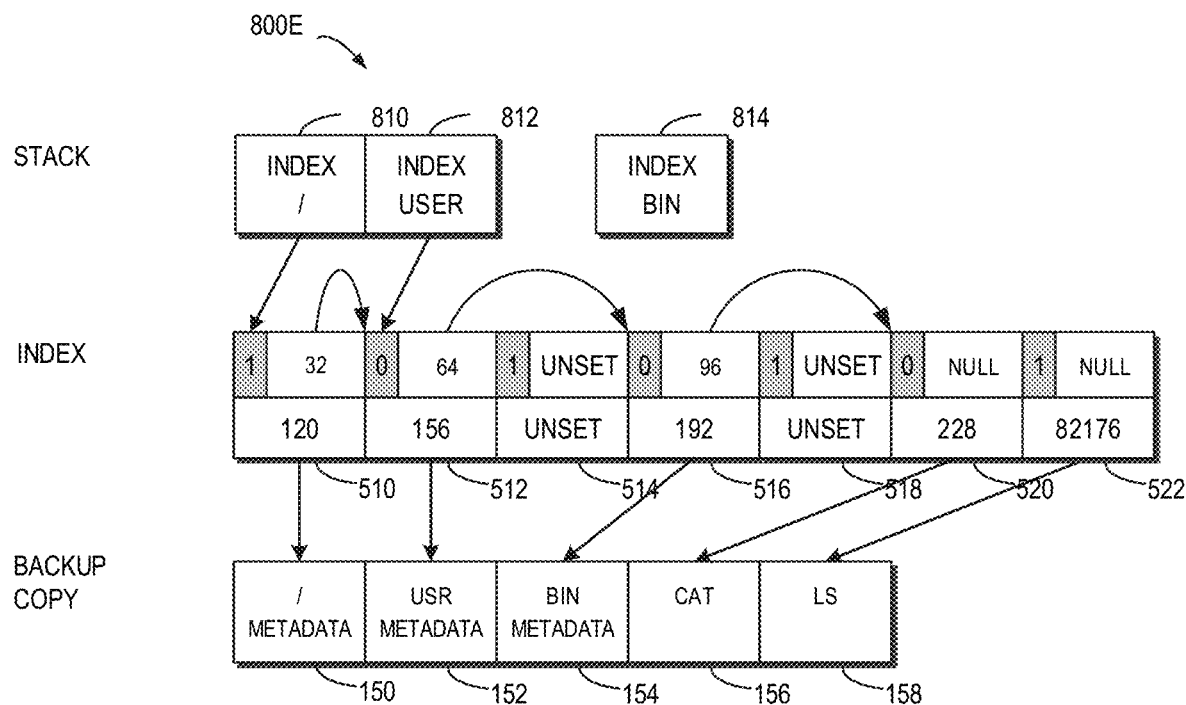

Operations about step E will be described with reference to FIG. 8E. As depicted, the backup block 158 for the data object "LS" may be added to the backup copy. Regarding the index, "the first child index" in the index entry 522 for the data object "LS" may be set as "null," and "the object index" in the index entry 522 may be set as the address of the backup block 158 of the data object "LS" in the backup copy, e.g., "82176." According to example implementations of the present disclosure, the index entry at the top of the stack is popped up in accordance with determining that all children of the parent data object have been processed. Regarding the stack, since the data object "LS" is the last child, the stack entry 814 at the top of the stack is popped up. At this point, the stack may comprise the stack entries 810 and 812.

Figure 8F:
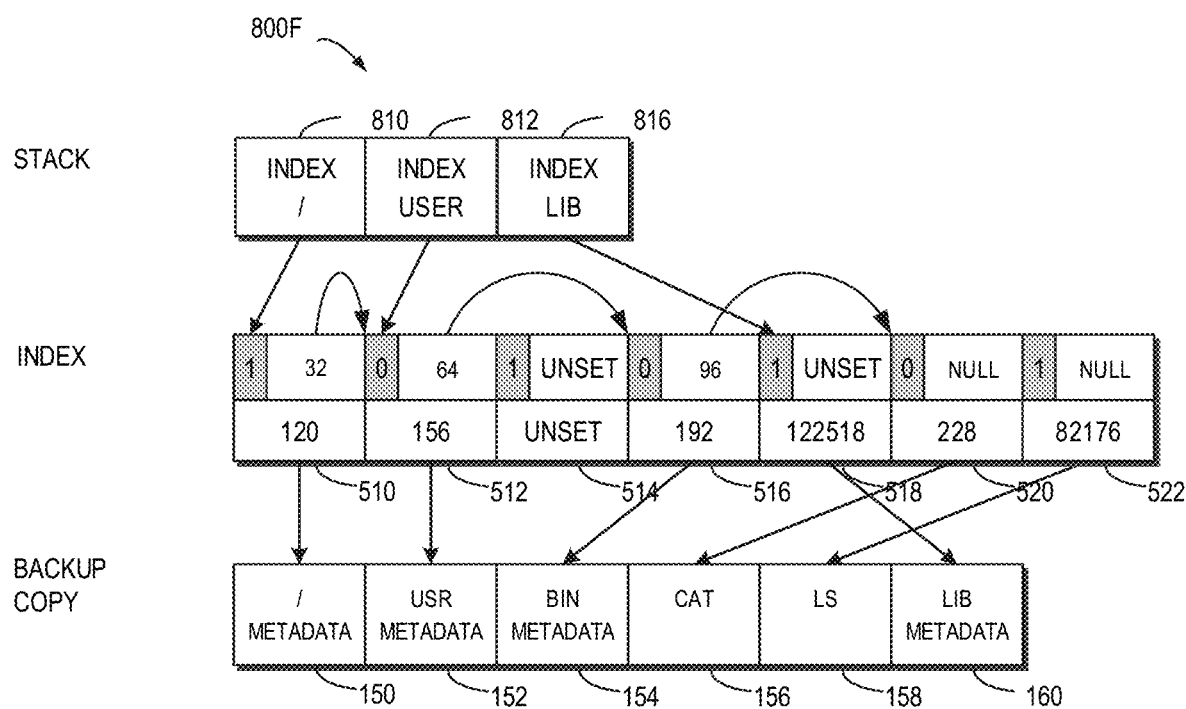

Operations about step F will be described with reference to FIG. 8F. As depicted, the backup block 160 for the data object "LIB" may be added to the backup copy. Regarding the index, "the object index" in the index entry 518 for the data object "LIB" may be set as the address of the backup block 160 of the data object "LIB" in the backup copy, e.g., "122518." Regarding the stack, the index of the data object "LIB" may be pushed into the stack to form a stack entry 816. At this point, the stack may comprise the stack entries 810, 812 and 816.

Figure 8G:
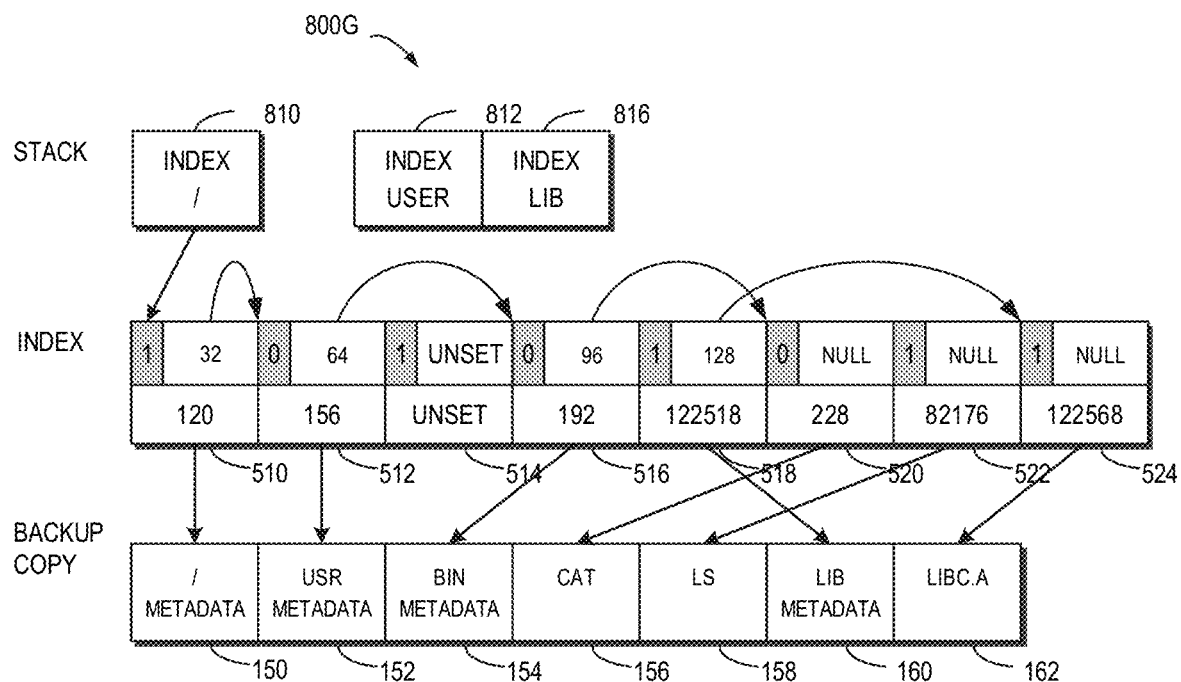

Operations about step G will be described with reference to FIG. 8G As depicted, the backup block 162 for the data object "LIBC.A" may be added to the backup copy. Regarding the index, the index entry 524 may be generated for the data object "LIBC.A," at which point "the first child index" in the index entry 524 may be defined as "null," the identifier may be defined as "1," and "the object index" may be defined as pointing to the address of the backup block 162 of the data object "LIBC.A" in the backup copy, e.g., "122568." "The first child index" in the index entry 518 for the data object "LIB" may be set as the address of the index entry 524 of the data object "LIBC.A" in the index, and "the first child index" in the index entry 522 of the data object "LS" may be set as "null." Regarding the stack, since each of the data objects "LIBC.A" and "LIB" is the last child, the stack entries 812 and 816 at the top of the stack may be popped up. At this point, the stack may comprise the stack entry 810.

Figure 8H:
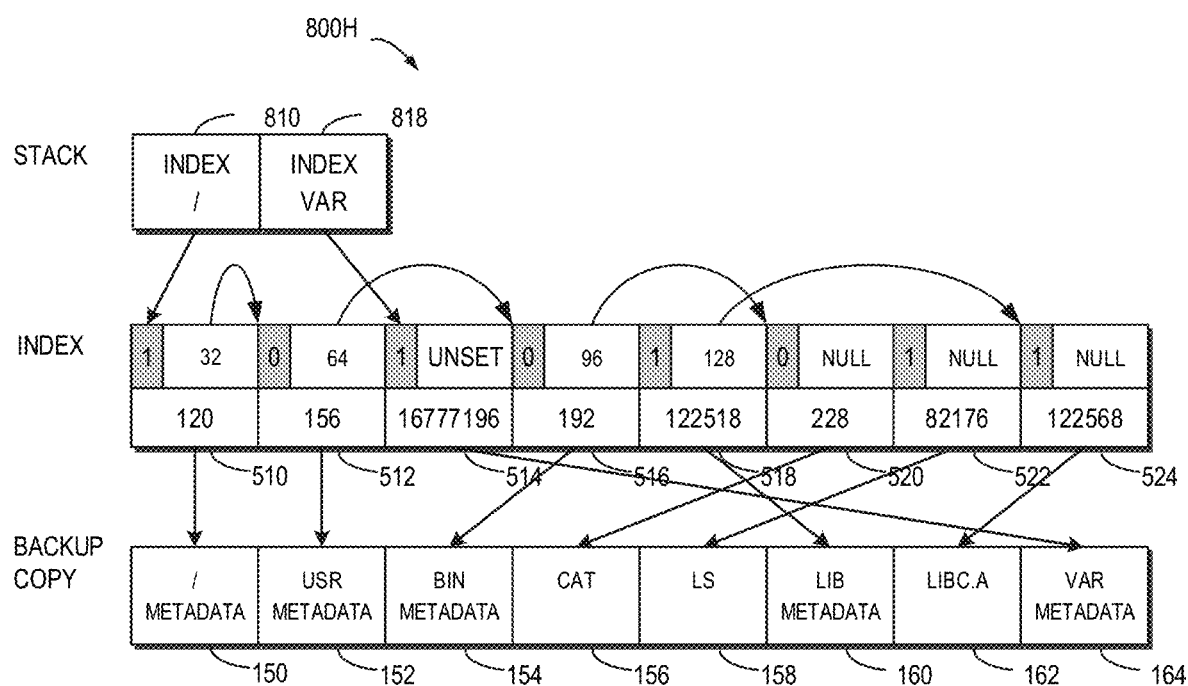

Operations about step H will be described with reference to FIG. 8H. As depicted, the backup block 164 for the data object "VAR" may be added to the backup copy. Regarding the index, "the object index" in the index entry 514 for the data object "VAR" may be set as the address of the backup block 164 of the data object "VAR" in the backup copy. Regarding the stack, the index of the data object "VAR" may be pushed into the stack to form a stack entry 818. At this point, the stack may comprise the stack entries 810 and 818.

Figure 8I:
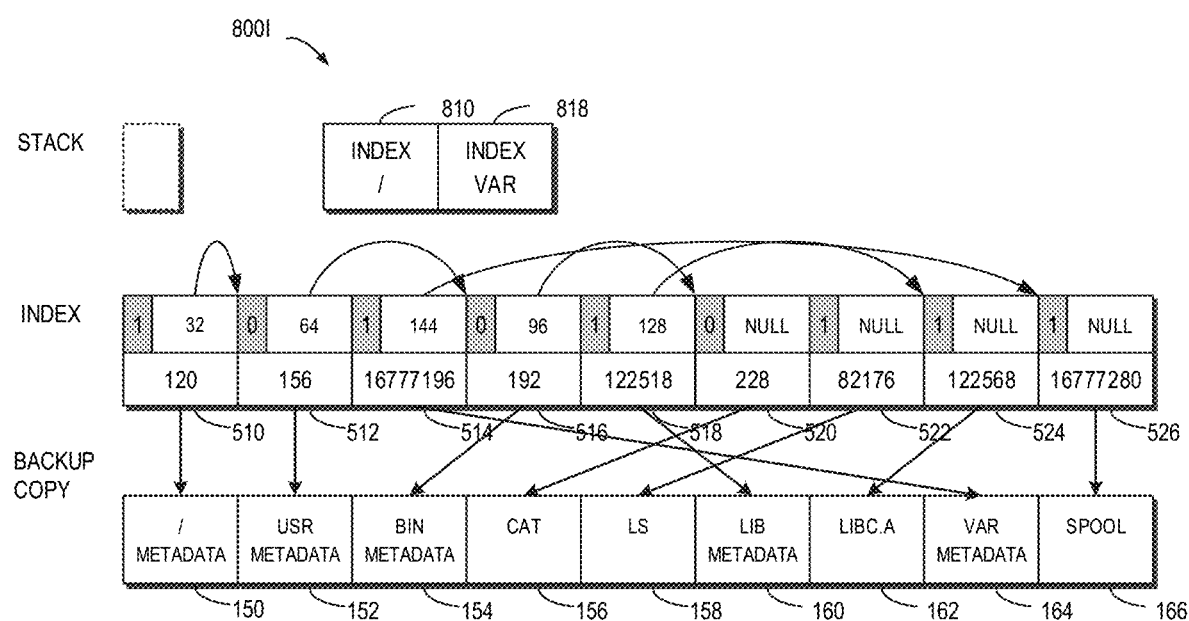

Operations about step I will be described with reference to FIG. 8I. As depicted, the backup block 166 for the data object "SPOOL" may be added to the backup copy. Regarding the index, the index entry 526 may be generated for the data object "SPOOL," at which point "the first child index" in the index entry 526 may be defined as "null," the identifier may be defined as "1," and "the object index" may be defined as pointing to the address of the backup block 166 of the data object "SPOOL" in the backup copy, e.g., "16777280." "The first child index" in the index entry 514 for the data object "VAR" may be set as the address of the index entry 526 of the data object "SPOOL" in the index. Regarding the stack, since each of the data objects "VAR"

and "/" is the last child, the stack entries 810 and 818 at the top of the stack may be popped up. At this point, the stack may be null.

Description has been presented on how to generate the index with reference to the figures. After the index is generated, a search operation may be performed by using the index. According to example implementations of the present disclosure, the data object which is desired to be recovered may be found based on the generated index. Suppose the user desires to recover the first data object in the application system, the first backup block corresponding to the to-be-recovered first data object may be found from the generated index. It will be understood that during reading the index, not only one index entry is read at a time, but a read may be performed according to a predetermined page size associated with the read operation. Generally, the predetermined page size is several times larger than that of the index entry, so a plurality of index entries may be read during one read operation. More details on how to read the index will be described with reference to FIG. 9 below.

Figure 9:
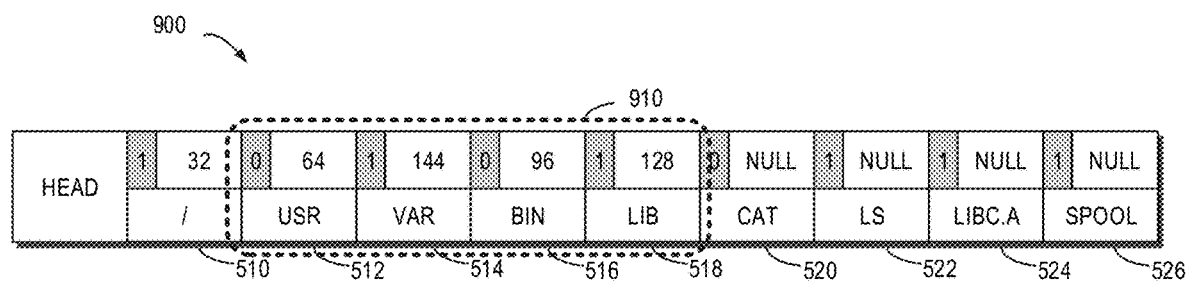
FIG. 9 schematically shows a block diagram for reading an index entry in the index according to example implementations of the present disclosure.

FIG. 9 schematically shows a block diagram 900 for reading index entries in the index according to example implementations of the present disclosure. Suppose it is desirable to recover data in the data object "USR," then at this point the index entry 512 corresponding to the data object "USR" may be found in the index. Subsequently, a page comprising the first index entry may be read from the index based on the predetermined page size associated with reading the index. Suppose the predetermined page size is 4 times as large as that of the index entry, then 4 index entries may be read to a cache 910 at one time. At this point, the cache 910 will comprise the index entries 512, 514, 516 and 518. The data object "USR" in the application system may be recovered based on the address of the backup block in the backup copy, which is indicated in the index entry 512.

It will be understood that index entries in the cache 910 may be re-used. For example, when receiving a recovery request for recovering another data object in the application system, an index entry corresponding to the received recovery request may be first searched for in the ache 910. If it is determined that there is a target index entry in the cache 910, then a corresponding address may be directly found from the cache and used for the recovery. That is, a target backup block corresponding to the target data object may be obtained based on the target address in the target index entry. With example implementations of the present disclosure, access operations on the index may be reduced, and recovery requests may be served using index entries with higher access speed in the cache as much as possible.

According to example implementations of the present disclosure, if a recovery request for recovering the data object "VAR" from the backup copy is received, a target index entry corresponding to the data object "VAR" may be searched for in the read page (i.e., cache 910). Since the data object "VAR" is the next sibling of the data object "USR," the index entry 514 for the data object "VAR" is stored next to the index entry 512 for the data object "USR" and has been loaded to the cache 910. At this point, there is no need to perform a read from the index, but the index entry 514 may be directly obtained from the cache 910 with a higher access speed. Based on the address of the data object "VAR" in the backup copy which is recorded in the index entry 514, it is possible to quickly find a backup block corresponding to the data object "VAR" and perform the following recovery operation.

According to example implementations of the present disclosure, if the target index entry does not exist in the read page, then a page comprising the target index entry may be read from the index based on the predetermined page size. Then, a target backup block corresponding to the target data object may be obtained based on the target address in the target index entry. If a recovery request for recovering the file "CAT" from the backup copy is received, then a target index entry corresponding to the file "CAT" may be searched for in the read page (i.e., cache 910). Since the index entry 520 for the file "CAT" is far away from the index entry 512 for the data object "USR," the index entry 520 has not been loaded to the cache 910. At this point, the index entry 520 needs to be directly read from the index. During reading the index entry 520 from the index, the number of the read index entries is also 4, so at this point the index entries 520, 522, 524 and 526 may be loaded to the cache.

It will be understood that since there is a limit to the size of the cache, when data loaded to the cache exceeds the limit, data in the cache may be updated based on, for example, the Least Recently Used rule or other rules. With example implementations of the present disclosure, during recovering the data object, time overheads of the recovery operation may be cut down by making sufficient use of an advantage that the cache has a higher access speed.

It will be understood that data objects under the same directory have a sibling relationship between them and usually share similar attributes, so users often desire to recover a plurality of data objects under the same directory. With example implementations of the present disclosure, index entries of the plurality of data objects with a sibling relationship are continuously stored in the index. Therefore, index entries related to the plurality of data objects may be loaded to the cache in one read operation. In this way, the possibility that the cache is hit during a next recovery operation may be increased, and furthermore the efficiency of the recovery operation may be improved.

While examples of the method according to the present disclosure have been described in detail with reference to FIGS. 2 to 9, description is presented below for the implementation of a corresponding apparatus. According to example implementations of the present disclosure, an apparatus is provided for managing an application system. The application system comprises a group of data objects, which comprises a parent data object, a first data object and a second data object, the parent data object being a parent of the first data object and the second data object in a hierarchical structure of the application system. The apparatus comprises: an obtaining module configured to obtain a backup copy for the group of data objects; an address module configured to determine a parent address of a parent backup block corresponding to the parent data object in the backup copy, a first address of a first backup block corresponding to the first data object in the backup copy, and a second address of a second backup block corresponding to the second data object in the backup copy, respectively; a generating module configured to generate a parent index entry, a first index entry and a second index entry based on the parent address, the first address and the second address, respectively; and a determining module configured to determine an index for the backup copy based on the parent index entry, the first index entry and the second index entry, the first index entry and the second index entry being continuous in the index.

According to example implementations of the present disclosure, the first data object is a first child of the parent data object, the second data object is a next sibling of the first data object, and the determining module comprises: an appending module configured to append the parent index entry to the index; append the first index entry to the parent index entry; and append the second index entry to the first index entry.

According to example implementations of the present disclosure, the apparatus further comprises: a location determining module configured to determine a first location of the first index entry in the index; and an updating module configured to update the parent index entry based on the first location so that the updated parent index entry comprises the first location.

According to example implementations of the present disclosure, the group of data objects further comprise a third data object, which is a next sibling of the second data object in a hierarchical structure of the application system, and the address module is further configured to determine a third address of a third backup block corresponding to the third data object in the backup copy; the generating module is further configured to generate a third index entry based on the third address; and the appending module is further configured to append the third index entry to the second index entry.

According to example implementations of the present disclosure, the parent index entry comprises: an index flag for indicating whether the parent data object is a last child in the hierarchical structure or not; a first child index for indicating a first location of the first index entry in the index; and an object index for indicating the parent address of the parent backup block corresponding to the parent data object in the backup copy.

According to example implementations of the present disclosure, the apparatus further comprises: a traversing module configured to obtain the parent data object by traversing the group of data objects in the hierarchical structure according to a depth-first rule a pushing module configured to push the parent index entry into a stack and append the parent index entry to the index; a recursive processing module configured to recursively process all children of the parent data object.

According to example implementations of the present disclosure, the recursive processing module comprises: a child processing module configured to push the first index entry into the stack and append the first index entry to the index.

According to example implementations of the present disclosure, the apparatus further comprises: a popping module configured to pop up an index entry at a top of the stack in accordance with determining that all the children of the parent data object have been processed.

According to example implementations of the present disclosure, the apparatus further comprises: a reading module configured to, in accordance with receiving a first recovery request for recovering the first data object from the backup copy, read a page that comprises the first index entry from the index based on a predetermined page size associated with reading the index; and a searching module configured to obtain the first backup block based on the first address in the first index entry.

According to example implementations of the present disclosure, the apparatus further comprises: a cache module configured to, in accordance with receiving a recovery request for recovering a target data object from the backup copy, search for a target index entry corresponding to the target data object in the read page; and the searching module is further configured to, in accordance with determining that the target index entry exists in the read page, obtain a target backup block corresponding to the target data object based on a target address in the target index entry.

According to example implementations of the present disclosure, the reading module is further configured to, in accordance with determining that the target index entry does not exist in the read page, read a page that comprises the target index entry from the index based on the predetermined page size; and the searching module is further configured to obtain the target backup block corresponding to the target data object based on the target address in the target index entry.

Figure 10:
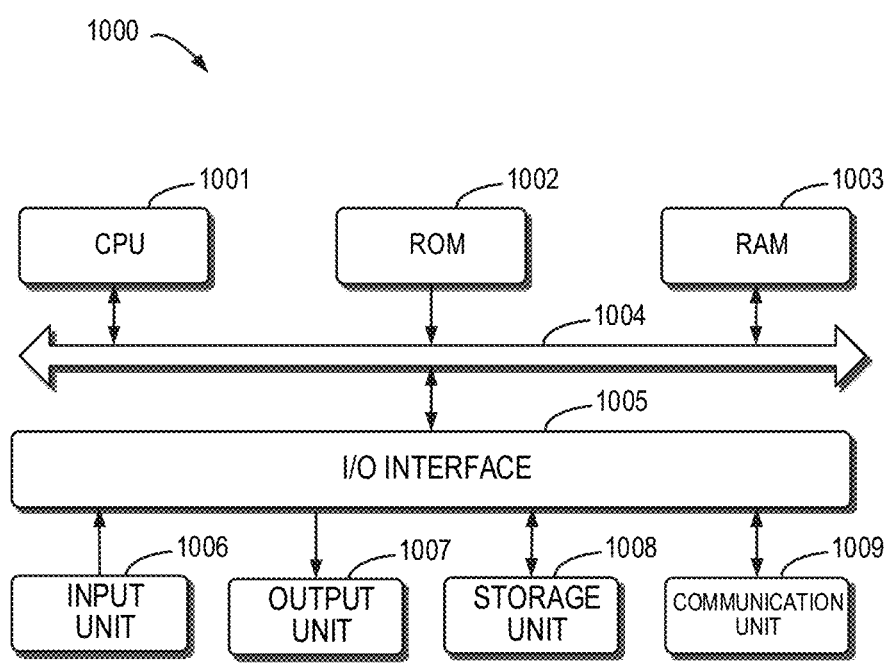
FIG. 10 schematically shows a block diagram of a device for managing an application system according to example implementations of the present disclosure.

FIG. 10 schematically shows a block diagram of a device 1000 for managing an application system according to example implementations of the present disclosure. As depicted, the device 1000 includes a central processing unit (CPU) 1001, which can execute various suitable actions and processing based on the computer program instructions stored in the read-only memory (ROM) 1002 or computer program instructions loaded in the random-access memory (RAM) 1003 from a storage unit 1008. The RAM 1003 can also store all kinds of programs and data required by the operations of the device 1000. CPU 1001, ROM 1002 and RAM 1003 are connected to each other via a bus 1004. The input/output (I/O) interface 1005 is also connected to the bus 1004.

A plurality of components in the device 1000 are connected to the I/O interface 1005, including: an input unit 1006, such as a keyboard, mouse and the like; an output unit 1007, e.g., various kinds of displays and loudspeakers etc.; a storage unit 1008, such as a magnetic disk and optical disk, etc.; and a communication unit 1009, such as a network card, modem, wireless transceiver and the like. The communication unit 1009 allows the device 1000 to exchange information/data with other devices via the computer network, such as Internet, and/or various telecommunication networks.

The above described process and treatment, such as the method 400 can also be executed by the processing unit 1001. For example, in some implementations, the method 400 can be implemented as a computer software program tangibly included in the machine-readable medium, e.g., the storage unit 1008. In some implementations, the computer program can be partially or fully loaded and/or mounted to the device 1000 via ROM 1002 and/or the communication unit 1009. When the computer program is loaded to the RAM 1003 and executed by the CPU 1001, one or more steps of the above described method 400 can be implemented. Alternatively, in other implementations, the CPU 1001 can also be configured in other suitable ways to realize the above procedure/method.

According to example implementations of the present disclosure, an electronic device is provided, the electronic device comprising: at least one processor; and a memory coupled to the at least one processor, the memory having instructions stored thereon, the instructions, when executed by the at least one processor, causing the device to perform acts for managing an application system. The application system comprises a group of data objects, which comprises a parent data object, a first data object and a second data object, the parent data object being a parent of the first data object and the second data object in a hierarchical structure of the application system. The acts include: obtaining a backup copy for the group of data objects; determining a parent address of a parent backup block corresponding to the parent data object in the backup copy, a first address of a first backup block corresponding to the first data object in the backup copy, and a second address of a second backup block corresponding to the second data object in the backup copy, respectively; generating a parent index entry, a first index entry and a second index entry based on the parent address, the first address and the second address, respectively; and determining an index for the backup copy based on the parent index entry, the first index entry and the second index entry, the first index entry and the second index entry being continuous in the index.

According to example implementations of the present disclosure, the first data object is a first child of the parent data object, the second data object is a next sibling of the first data object, and determining the index for the backup copy comprises: appending the parent index entry to the index; appending the first index entry to the parent index entry; and appending the second index entry to the first index entry.

According to example implementations of the present disclosure, the acts further comprise: determining a first location of the first index entry in the index; and updating the parent index entry based on the first location so that the updated parent index entry comprises the first location.

According to example implementations of the present disclosure, the group of data objects further comprise a third data object, which is a next sibling of the second data object in the hierarchical structure of the application system, and the acts further comprise: determining a third address of a third backup block corresponding to the third data object in the backup copy; generating a third index entry based on the third address; and appending the third index entry to the second index entry.

According to example implementations of the present disclosure, the parent index entry comprises: an index flag for indicating whether the parent data object is the last child in the hierarchical structure or not; a first child index for indicating a first location of the first index entry in the index; and an object index for indicating a parent address of a parent backup block corresponding to the parent data object in the backup copy.

According to example implementations of the present disclosure, the acts further comprise: obtaining the parent data object by traversing the group of data objects in the hierarchical structure according to a depth-first rule; pushing the parent index entry into a stack and appending the parent index entry to the index; and processing all children of the parent data object recursively.

According to example implementations of the present disclosure, processing all the children of the parent data object recursively comprises: pushing the first index entry into the stack, and appending the first index entry to the index.

According to example implementations of the present disclosure, the acts further comprise: popping up an index entry at a top of the stack in accordance with determining that all the children of the parent data object have been processed.

According to example implementations of the present disclosure, the acts further comprise: in accordance with receiving a first recovery request for recovering the first data object from the backup copy, reading a page that comprises the first index entry from the index based on a predetermined page size associated with reading the index; and obtaining the first backup block based on the first address in the first index entry.

According to example implementations of the present disclosure, the acts further comprise: in accordance with receiving a recovery request for recovering a target data object from the backup copy, searching for a target index entry corresponding to the target data object in the read page; and in accordance with determining that the target index entry exists in the read page, obtaining a target backup block corresponding to the target data object based on a target address in the target index entry.

According to example implementations of the present disclosure, the acts further comprise: in accordance with determining that the target index entry does not exist in the read page, reading a page that comprises the target index entry from the index based on the predetermined page size; and obtaining the target backup block corresponding to the target data object based on the target address in the target index entry.

According to example implementations of the present disclosure, there is provided a computer program product. The computer program product is tangibly stored on a non-transitory computer-readable medium and comprises machine-executable instructions which are used to implement the method according to the present disclosure.

According to example implementations of the present disclosure, there is provided a computer-readable medium. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combination of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combination of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for managing an application system, the application system comprising a group of data objects, the group of data objects comprising a parent data object, a first data object and a second data object, the parent data object being a parent of the first data object and the second data object in a hierarchical structure of the application system, the method comprising:
    obtaining a backup copy for the group of data objects;
    determining a parent address of a parent backup block corresponding to the parent data object in the backup copy, a first address of a first backup block corresponding to the first data object in the backup copy, and a second address of a second backup block corresponding to the second data object in the backup copy, respectively;
    generating a parent index entry, a first index entry and a second index entry based on the parent address, the first address and the second address, respectively; and
    determining an index for the backup copy based on the parent index entry, the first index entry and the second index entry, wherein the first index entry and the second index entry are continuous in the index.

2. The method of claim 1, wherein the first data object is a first child of the parent data object, the second data object being a next sibling of the first data object, and wherein determining the index for the backup copy comprises:
    appending the parent index entry to the index;
    appending the first index entry to the parent index entry; and
    appending the second index entry to the first index entry.

3. The method of claim 2, further comprising:
    determining a first location of the first index entry in the index; and
    updating the parent index entry based on the first location so that the updated parent index entry comprises the first location.

4. The method of claim 2, wherein the group of data objects further comprises a third data object, wherein the third data object is a next sibling of the second data object in the hierarchical structure of the application system, the method further comprising:
  determining a third address of a third backup block corresponding to the third data object in the backup copy;
  generating a third index entry based on the third address; and
  appending the third index entry to the second index entry.

5. The method of claim 1, wherein the parent index entry comprises:
  an index flag for indicating whether the parent data object is a last child in the hierarchical structure;
  a first child index for indicating a first location of the first index entry in the index; and
  an object index for indicating the parent address of the parent backup block corresponding to the parent data object in the backup copy.

6. The method of claim 1, further comprising:
  obtaining the parent data object by traversing the group of data objects in the hierarchical structure according to a depth-first rule;
  pushing the parent index entry into a stack and appending the parent index entry to the index; and
  processing all children of the parent data object recursively.

7. The method of claim 1, wherein processing all the children of the parent data object recursively comprises:
  pushing the first index entry into the stack, and appending the first index entry to the index.

8. The method of claim 6, further comprising:
  popping up an index entry at a top of the stack in accordance with determining that all the children of the parent data object have been processed.

9. The method of claim 1, further comprising:
  in response to receiving a first recovery request for recovering the first data object from the backup copy,
    reading a page that comprises the first index entry from the index based on a predetermined page size associated with reading the index; and
    obtaining the first backup block based on the first address in the first index entry.

10. The method of claim 1, further comprising:
  in response to receiving a recovery request for recovering a target data object from the backup copy,
    searching for a target index entry corresponding to the target data object in the page; and
    based on a determination that the target index entry exists in the page, obtaining a target backup block corresponding to the target data object based on a target address in the target index entry.

11. The method of claim 10, further comprising:
  based on a determination that the target index entry does not exist in the page,
    reading a second page that comprises the target index entry from the index based on the predetermined page size; and
    obtaining the target backup block corresponding to the target data object based on the target address in the target index entry.

12. An electronic device, comprising:
  at least one processor; and
  a memory coupled to the at least one processor, the memory having instructions stored thereon, the instructions, when executed by the at least one processor, causing the device to perform a method for managing an application system, the application system comprising a group of data objects, the group of data objects comprising a parent data object, a first data object and a second data object, the parent data object being a parent of the first data object and the second data object in a hierarchical structure of the application system, the method comprising:
    obtaining a backup copy for the group of data objects;
    determining a parent address of a parent backup block corresponding to the parent data object in the backup copy, a first address of a first backup block corresponding to the first data object in the backup copy, and a second address of a second backup block corresponding to the second data object in the backup copy, respectively;
    generating a parent index entry, a first index entry and a second index entry based on the parent address, the first address and the second address, respectively; and
    determining an index for the backup copy based on the parent index entry, the first index entry and the second index entry, wherein the first index entry and the second index entry are continuous in the index.

13. The electronic device of claim 12, wherein the first data object is a first child of the parent data object, the second data object being a next sibling of the first data object, and wherein determining the index for the backup copy comprises:
  appending the parent index entry to the index;
  appending the first index entry to the parent index entry; and
  appending the second index entry to the first index entry.

14. The electronic device of claim 13, wherein the method further comprises:
  determining a first location of the first index entry in the index; and
  updating the parent index entry based on the first location so that the updated parent index entry comprises the first location.

15. The electronic device of claim 14, wherein the group of data objects further comprises a third data object, wherein the third data object is a next sibling of the second data object in the hierarchical structure of the application system, the method further comprising:
  determining a third address of a third backup block corresponding to the third data object in the backup copy;
  generating a third index entry based on the third address; and
  appending the third index entry to the second index entry.

16. The electronic device of claim 12, wherein the parent index entry comprises:
  an index flag for indicating whether the parent data object is a last child in the hierarchical structure;
  a first child index for indicating a first location of the first index entry in the index; and
  an object index for indicating the parent address of the parent backup block corresponding to the parent data object in the backup copy.

17. The electronic device of claim 12, wherein the method further comprises:
  obtaining the parent data object by traversing the group of data objects in the hierarchical structure according to a depth-first rule;
  pushing the parent index entry into a stack and appending the parent index entry to the index; and
  processing all children of the parent data object recursively.

18. The electronic device of claim 12, wherein the method further comprises:
  in response to receiving a first recovery request for recovering the first data object from the backup copy,
    reading a page that comprises the first index entry from the index based on a predetermined page size associated with reading the index; and
    obtaining the first backup block based on the first address in the first index entry.

19. The electronic device of claim 18, wherein the method further comprises:
  in response to receiving a recovery request for recovering a target data object from the backup copy,
    searching for a target index entry corresponding to the target data object in the page; and
    based on a determination that the target index entry exists in the page, obtaining a target backup block corresponding to the target data object based on a target address in the target index entry.

20. A computer program product, tangibly stored on a non-transitory computer-readable medium and comprising machine-executable instructions, which are used to perform a method for managing an application system, the application system comprising a group of data objects, the group of data objects comprising a parent data object, a first data object and a second data object, the parent data object being a parent of the first data object and the second data object in a hierarchical structure of the application system, the method comprising:
  obtaining a backup copy for the group of data objects;
  determining a parent address of a parent backup block corresponding to the parent data object in the backup copy, a first address of a first backup block corresponding to the first data object in the backup copy, and a second address of a second backup block corresponding to the second data object in the backup copy, respectively;
  generating a parent index entry, a first index entry and a second index entry based on the parent address, the first address and the second address, respectively; and
  determining an index for the backup copy based on the parent index entry, the first index entry and the second index entry, wherein the first index entry and the second index entry are continuous in the index.

* * * * *